US008810980B2

(12) United States Patent
Legaspi et al.

(10) Patent No.: US 8,810,980 B2
(45) Date of Patent: Aug. 19, 2014

(54) SYSTEMS AND METHODS FOR AUTOMATICALLY RE-ROUTING POWER

(76) Inventors: Ferdinand Villegas Legaspi, Chino, CA (US); Michael McGuire, Sr., Cathedral City, CA (US); Dana Denton, Moreno Valley, CA (US)

(*) Notice: Subject to any disclaimer, the term of this patent is extended or adjusted under 35 U.S.C. 154(b) by 245 days.

(21) Appl. No.: 13/204,674

(22) Filed: Aug. 6, 2011

(65) Prior Publication Data

US 2013/0033788 A1 Feb. 7, 2013

(51) Int. Cl.
*H02H 3/00* (2006.01)
*H04B 3/00* (2006.01)
*H04B 15/00* (2006.01)
*H02H 11/00* (2006.01)
*H02H 9/08* (2006.01)
*H02H 3/08* (2006.01)
*H02H 9/00* (2006.01)
*H02H 3/24* (2006.01)
*H02H 3/04* (2006.01)

(52) U.S. Cl.
CPC . *H02H 9/00* (2013.01); *H02H 3/08* (2013.01); *H02H 3/24* (2013.01); *H02H 9/08* (2013.01); *H02H 3/04* (2013.01)
USPC ............................. 361/42; 307/90; 307/326

(58) Field of Classification Search
USPC ............... 307/90, 116, 125, 126, 326; 361/42
See application file for complete search history.

(56) References Cited

U.S. PATENT DOCUMENTS

| 2,924,752 | A | | 2/1960 | Scott et al. |
| 4,949,214 | A | | 8/1990 | Spencer |
| 5,168,137 | A | | 12/1992 | Hufnagel et al. |
| 5,541,457 | A | * | 7/1996 | Morrow .......................... 307/38 |
| 7,145,757 | B2 | | 12/2006 | Shea et al. |
| 7,633,780 | B2 | | 12/2009 | Endo et al. |
| 2007/0279162 | A1 | * | 12/2007 | Zhang et al. ..................... 335/21 |
| 2008/0070648 | A1 | * | 3/2008 | Kang et al. ................. 455/575.3 |
| 2010/0277325 | A1 | * | 11/2010 | Kopelman .................... 340/595 |
| 2011/0059637 | A1 | * | 3/2011 | Macumber .................... 439/188 |

* cited by examiner

*Primary Examiner* — Rexford Barnie
*Assistant Examiner* — Rasem Mourad

(57) ABSTRACT

Embodiments of the invention are directed to systems and methods using an interruption device for automatically re-routing power upon the occurrence of an event. The interruption device may interrupt the flow of power to an external device upon the detection of an event, such as a circuit overload or short circuit. Interrupting the flow of power may cause power to be cut off to a receiving connector, which supplies power to the external device, by re-routing the flow of power away from the receiving connector by the use of relay switches. By interrupting and re-routing the flow of power, an electrical fire, damage to the external device or other hazard may be prevented. Once the source of the problem, such as a defective external device, has been removed or fixed, the flow of power may be re-routed back to the receiving connector.

20 Claims, 6 Drawing Sheets

SYSTEMS AND METHODS FOR AUTOMATICALLY RE-ROUTING POWER

CLAIM OF PRIORITY

The present Application for Patent claims priority to U.S. Provisional Application No. 61/401,005 entitled "Methods of Rerouting Alternating Current Terminals", filed Aug. 6, 2010, and hereby expressly incorporated by reference herein.

FIELD

The present invention relates to the field of automated safety capabilities for appliances or other devices, in particular, to systems and methods for automatically re-routing power upon the occurrence of a safety event.

BACKGROUND OF THE INVENTION

December and January are the most dangerous months for electrical fires. Fire deaths are highest in winter months which call for more indoor activities and increases in lighting, heating, and appliance use. Many of these electrical fires (both residential and commercial) can be traced to overloading electrical outlets and/or defective appliances (or other devices) plugged into electrical outlets as circuit breakers do not trip when excessive amounts of energy flow through electrical cords.

Fires arising from electrical cords are devastating to families as well as businesses as the supply of electricity is cut off by the fire or turned off by emergency personnel, such as the fire department, when responding to the fire. The loss of electricity in the vicinity results in other homes and businesses also losing electricity. When businesses lose electricity they have to shut down and as a result, income to not only the businesses but the employees of the businesses is lost.

Another cause of electrical fires is the explosion of electronic parts, such as integrated circuits (IC), transistors, resistors and capacitors, in small electronic gadgets and household appliances due to electronics fatigue or circuit deficiency. The damage caused by the explosion of electronic parts can trigger residential fires resulting in lives and properties being affected.

One way to reduce the damage caused by electrical fires is to interrupt the flow of electricity or to shut off the source of energy or power to the household appliances, power outlets and lines, or other devices, before a fire starts. However, if no one is around, the power source cannot be shut off or interrupted. Although devices like circuit breakers, ground fault circuit interrupters (GFCI) and surge protector exists, they do not shutoff the power source immediately before the fires start and as a result, fires are allowed to not only start but to proliferate causing significant amounts of damage. For example, it is not uncommon for a fire, within minutes of bursting into flames, to consume the contents, walls and ceiling of the room where the fire started. Furthermore, the combination of heat, smoke and carbon monoxide can kill everyone in the area.

Consequently, a systems and methods for automatically re-routing power upon the occurrence of an overloaded circuit or a short circuit is needed.

SUMMARY

One feature of the present invention provides an interruption device for automatically interrupting and re-routing power upon the occurrence of an event. The interruption device includes a re-routing module comprising a control module for receiving and distributing power from a power source; a first relay module, in communication with the control module, for switching a flow of power within the interruption device between a first path and a second path; a first transformer module, in communication with the first relay module, for interrupting the flow of power upon the occurrence of an event; a second transformer module, in communication with the first relay module, for re-routing the flow of power upon the occurrence of the event; and a second relay module, in communication with the second transformer module, for providing notification of the re-routing of the flow of power.

The interruption module may further comprise a receiving connector for providing the flow of power to an external device. The receiving connector includes a first connection point and a second connection point, the first connection point in communication with the first relay module and the second connection point in communication with the control module.

The first transformer module includes a first transformer having a first winding and a second winding; a first full wave rectifier, connected in parallel with the second winding of the first transformer; and a first capacitor, connected in parallel with the first full wave rectifier. The first relay module includes a first switch operable between a first position and a second position; and a first magnetic coil, connected to the first transformer module, for causing the first switch to actuate between the first and second positions when energized.

The second transformer module includes a second transformer having a first transformer winding and a second transformer winding; a second full wave rectifier, connected in parallel with the second transformer winding of the second transformer; and a second capacitor, connected in parallel with the second full wave rectifier. The second relay module includes a second switch operable between a first switch position and a second switch position; a second magnetic coil, connected to the second transformer module, for causing the second switch to actuate between the first and second switch positions when energized; and an event notifier, in communication with the second switch, for providing the notification of the re-routing of the flow of power.

Another feature of the present invention provides that when the first switch is in the first position, the first connection point of the receiving connector is connected to a hot line of the power source via the control module and the second connection point of the receiving connector is connected to a neutral line of the power source via the control module causing the flow of power to flow along the first path to the receiving connector.

Yet another feature of the present invention provides that when the first switch is in the second position, the first connection point of the receiving connector is connected to the neutral line of the power source causing the neutral line to be connected to the first winding of the first transformer powering on the transformer and switching the flow of power from the first path to the second path.

Yet another feature of the present invention provides that when the first switch is in the second position, the second transformer is powered on causing the second switch to actuate from the first switch position to the second switch position re-routing the flow of power to the event notifier.

Yet another feature of the present invention provides that the flow of power is returned to the first path and the receiving connector once the event has been removed or repaired.

Yet another feature of the present invention provides an output switch module, in communication with the re-routing module, for receiving a power plug from an external device for supplying the flow of power to the external device. The output switch module includes at least one switch mechanism for receiving a prong from the power plug of the external device; and at least one output switch coupled to the re-routing module; and wherein the insertion of the prong into the at least one switch mechanism causes the at least one switch mechanism to engage and push down on the least one output switch causing the flow of energy from the re-routing module to flow into the power plug.

Yet another feature provides for a touch pad module, in communication with the re-routing module, for re-routing the flow of power upon sensing heat when touched by a hand. The touch pad module includes a plurality of receiving connectors for receiving a plurality of power plugs from a plurality of external devices; a heat sensing switch in communication with the plurality of receiving connectors and the re-routing module, the heat sensing switch actuating to an open position upon the sensing of the heat causing the flow of power to be re-routed away from the plurality or receiving connectors.

Yet another feature provides an interruption device for automatically interrupting and re-routing power upon the occurrence of an event. The interruption device includes a re-routing module and an output switch module, in communication with the re-routing module, for receiving a power plug from an external device for supplying the flow of power to the external device. The output module includes a control module for receiving and distributing power from a power source; a first relay module, in communication with the control module, for switching a flow of power within the interruption device between a first path and a second path; a first transformer module, in communication with the first relay module, for interrupting the flow of power upon the occurrence of an event; a second transformer module, in communication with the first relay module, for re-routing the flow of power upon the occurrence of the event; and a second relay module, in communication with the second transformer module, for providing notification of the re-routing of the flow of power. The output switch module includes at least one switch mechanism for receiving a prong from the power plug of the external device; and at least one output switch coupled to the re-routing module; and wherein the insertion of the prong into the at least one switch mechanism causes the at least one switch mechanism to engage and push down on the least one output switch causing the flow of energy from the re-routing module to flow into the power plug.

Yet another feature provides an interruption device for automatically interrupting and re-routing power upon the occurrence of an event. The interruption device includes a re-routing module and a touch pad module, in communication with the re-routing module, for re-routing the flow of power upon sensing heat when touched by a hand, the touch pad module. The re-routing module includes a control module for receiving and distributing power from a power source; a first relay module, in communication with the control module, for switching a flow of power within the interruption device between a first path and a second path; a first transformer module, in communication with the first relay module, for interrupting the flow of power upon the occurrence of an event; a second transformer module, in communication with the first relay module, for re-routing the flow of power upon the occurrence of the event; and a second relay module, in communication with the second transformer module, for providing notification of the re-routing of the flow of power. The touch pad module includes a plurality of receiving connectors for receiving a plurality of power plugs from a plurality of external devices; and a heat sensing switch in communication with the plurality of receiving connectors and the re-routing module, the heat sensing switch actuating to an open position upon the sensing of the heat causing the flow of power to be re-routed away from the plurality or receiving connectors.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION OF THE INVENTION

Figure 1:
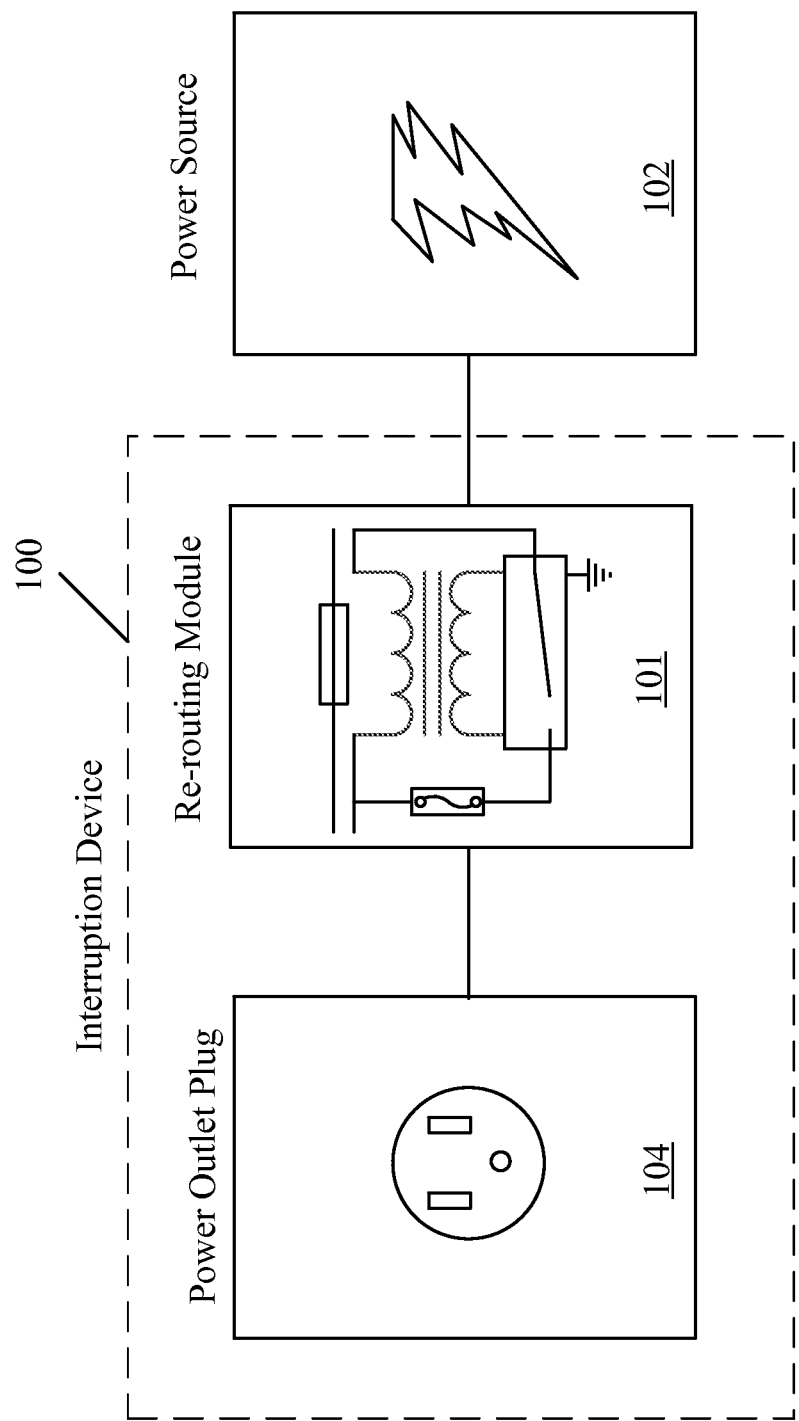
FIG. 1 is a block diagram illustrating a general overview of system for automatically interrupting and re-routing power upon the occurrence of an event, according to an embodiment.

The following detailed description is of the best currently contemplated modes of carrying out the invention. The description is not to be taken in a limiting sense, but is made merely for the purpose of illustrating the general principles of the invention. In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may not be shown detail in order not to obscure the embodiments.

Also, it is noted that the embodiments may be described as a process that is depicted as a flowchart, a flow diagram, a structure diagram, or a block diagram. Although the operations may be described as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

In the following description, certain terminology is used to describe certain features of one or more embodiments of the invention. The terms "object" and "external device" refers to any type of electrical and/or mechanical device which operates or runs on power. An external device includes, but is not limited to, a stove, oven, microwave, fryer, toaster, barbeque, dishwasher, clothes dryer, washing machine, freezer, refrigerator, water heater, trash compactor, air conditioner, television, radio, CD player, DVD player, video game consoles, telephones and clocks. The term "event" refers to any type of emergency or developing emergency including, but not limited to, a short circuit, a circuit overload and malfunctioning external device.

Embodiments of the invention are directed to systems and methods using an interruption device for automatically re-routing power upon the occurrence of an event. The interruption device may interrupt the flow of power (or energy) from a power source to an object or external device upon the detection of an event, such as a circuit overload or short circuit. Interrupting the flow of power may cause power to be cut off to a receiving connector, which supplies power to the external device, by re-routing the flow of power away from the receiving connector by the use of relay switches. By interrupting and re-routing the flow of power, an electrical fire, damage to the external device or other hazard may be prevented. Once the source of the problem, such as a defective external device, has been removed or fixed, the flow of power may be re-routed back to the receiving connector. In other words, the interruption device may hold the flow of power (i.e. electricity) to the receiving connector in which the external device is plugged into upon the detection of an event. As such, the interruption device can be utilized as a replacement for a circuit breaker and can be utilized for overload protection for external devices, such as appliances, in homes.

According to one embodiment, the interruption device may continuously interrupt the flow of the power (or energy) from the power source by utilizing mechanical switches. The switches may be in a no contact (N.C.) position until triggered by insertion of protruding prongs of a power cord or plug from an external device. The insertion of the protruding prongs causes the switches to connect the flow of power (or energy) to the external devices. Upon the occurrence of an event, such as a circuit overload or short circuit, the flow of power (or energy) is re-routed from a first path, which provides a flow of power to the external device, to a second path which directs the flow of power away from the external device. In other words, the flow of power is continuously interrupted by the mechanical switches of the output switch module. Once the problem has been removed or repaired, the flow of power (energy) to the external device resumes.

According to another embodiment, the interruption device can include a timer for programming a period of time in which to interrupt and re-route the flow of power upon a detection of fluctuating current. That is, the use of a timer allows the distribution of power to be delayed or interrupted when an abnormal status of the current or fluctuating current from the power source is detected.

In one example, if the flow of power (energy) distributed from the power source is between 100 VAC to 120 VAC, the interruption device will run its distribution (or flow) of power normally however, if the flow of power (energy) is suddenly fluctuating between 100 VAC to 220 VAC, the timer (programmable between 10 to 60 seconds) will interrupt the flow of power (energy) for the time period specified by the timer. If the abnormal flow of energy from the source is continuous, a circuit control board (or control module) will override the timer and re-route the flow of power (energy) away from the receiving connector and the external device until the current is back to normal.

In another example, if the power source provides 110 VAC, the external device receives 110 VAC. However, if the external device is receiving 220 VAC, to prevent the external device from being damaged, the timer will delay the distribution (or flow) of energy. If the output remains abnormal, the circuit control board (or control module) can override the timer and re-route the flow of energy away from the receiving connector and external device. Conversely, if the power source is 220 VAC and the external device operates on 110 VAC, the timer will delay the distribution (or flow) of energy.

In other words, the timer interface can be utilized to supply a flow of power to external devices, such as appliances, and interrupt and re-route the flow of power to the appliances upon the detection of an event, such as an electrical malfunction, for a specified time period. If the event does not correct itself within the specified time period, the flow of power may remain re-routed until the event has been removed or repaired.

According to yet another embodiment, the interruption device can hold the supply of power (energy) upon the detection of heat, for example the heat from human hands. The interruption device can include a touch pad sensor that serves as a switch to interrupt and re-route the flow of power (energy) to the external device if the touch pad sensor is touched by hands.

As described above, the re-routing module can be used to interrupt the flow of power (energy) upon the occurrence of an event, such as a short circuit or circuit overload. For example, if a child places something, such as a piece of metal, in the hot and ground lines of the receiving connector (i.e. electrical outlet), the re-routing module will interrupt the flow of power (electricity) so as not to shock child.

Overview

FIG. 1 is a block diagram illustrating a general overview of a system for automatically interrupting and re-routing power upon the occurrence of an event. The event may be an early indication of a developing emergency. As shown, an interruption device 100 may be connected to and receive power from a power source 102. The interruption device 100 may include a re-routing module, described in further detail below, and a receiving connector 104 for receiving a power cord or plug of an external device, such as an appliance. The re-routing module 101 of the interruption device 100 may be used to re-route the flow power upon the occurrence of an event, such as an abnormal flow of electricity from the appliance, which then interrupts the flow of power being supplied to the receiving connector 104. As the flow of power is re-routed away from the receiving connector 104, the flow of power is interrupted to the appliance preventing the appliance from being damaged from a circuit overload, short circuit or other event.

Interruption Device

Figure 2:
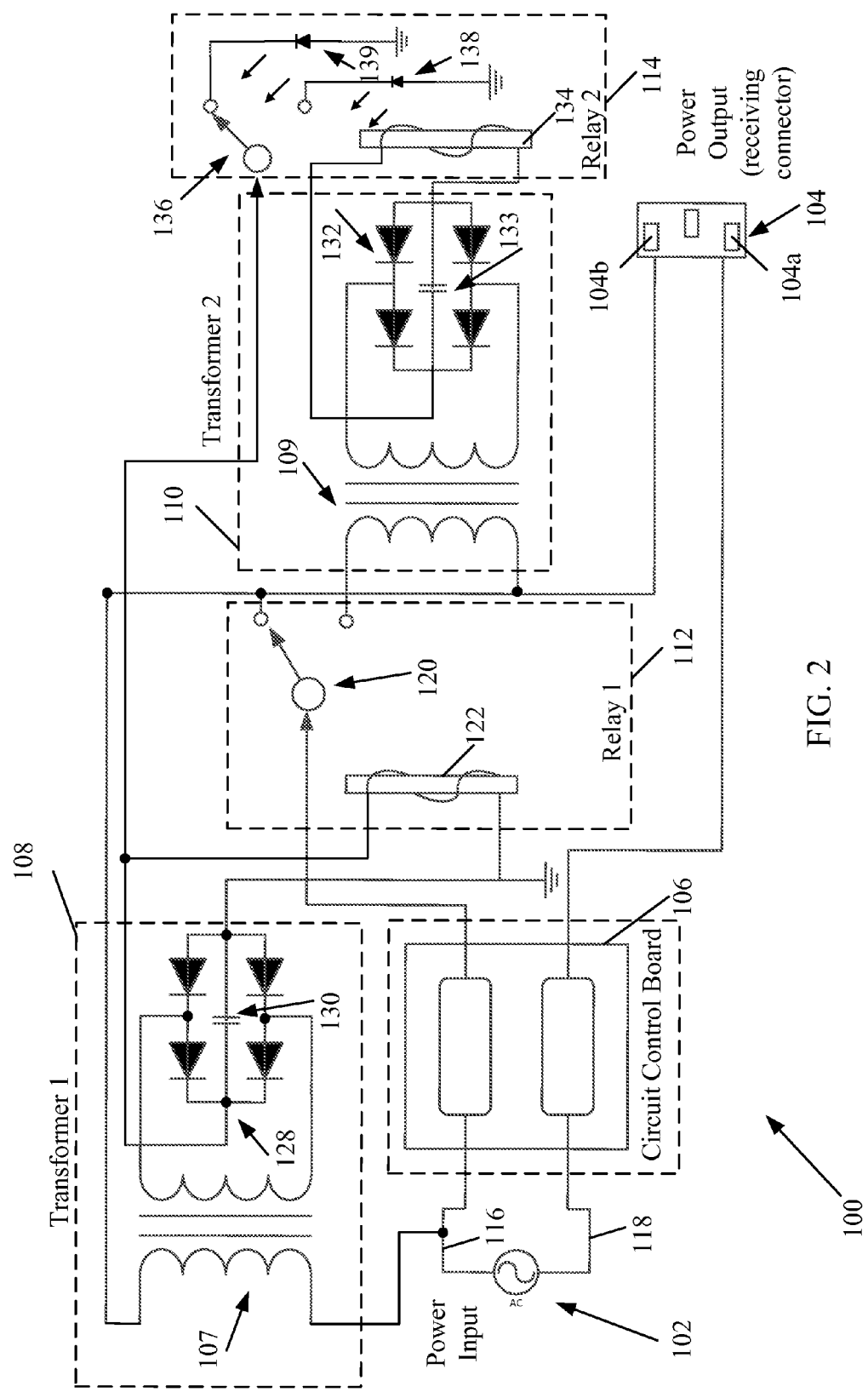
FIG. 2 is a schematic diagram of the interruption device 100 of FIG. 1 for interrupting and re-routing the flow of power upon the occurrence of an event.

FIG. 2 is a schematic diagram of the interruption device 100 of FIG. 1 for interrupting and re-routing the flow of power upon the occurrence of an event. The interruption device 100 may be used to interrupt and re-route the flow of power to an external device or object, such as an appliance, by plugging the interruption device 100 into the power source 102 and plugging the appliance into the receiving connector 104 of the interruption device 100. That is, the appliance receives the flow of power from the power source 102 by way of the receiving connector 104 of the interruption device 100. Upon the occurrence of an event, the interruption device 100 may interrupt and re-route the flow of power away from the receiving connector 104, and thus the appliance, so as to not damage the appliance and prevent a fire from starting.

In accordance with one embodiment, the power source 102 may be supplied to the interruption device 100, the interruption device 100 comprising the re-routing module 101 and the receiving connector 104. As described in more detail below, the re-routing module 101 may include a circuit control board or control module 106, transformer modules 108, 110 and relay modules 112, 114. Each of the transformer modules 108, 110 may be comprised of a transformer, a full wave rectifier, connected in parallel with the second winding of the transformer, and a capacitor, connected in parallel with the full wave rectifier, for lessening the variation in the rectified AC output voltage waveform from the full wave rectifier. Each of the relay modules 112, 114 may comprise a single pole, double throw switch, operable between a first position and a second position, and a magnetic coil for causing the single pole, double throw switch to actuate between the first position and the second position as well as from the second position to the first position when energized. The control module 106 may be any module or board known in the art that is capable of receiving and distributing power from a power source. In the event an excessive load or short circuit is detected, the control module 106 can power on the second relay module 114 triggering the interruption and re-routing of the flow of power away from the receiving connector 104 and the appliance.

As shown, the power input source 102 may be an AC power source which provides an alternating current (AC) power signal to the interruption device 100. The AC power source 102 may include a hot line 116 and a neutral line 118 which are supplied or connected to the control module 106 within the re-routing module 101 of the interruption device 100. The hot line 116 may also be connected to one end of a primary winding of a first transformer in the first transformer module 108 so that when a neutral line is connected to the other end of the primary winding, the first transformer is powered on.

Normal Operation—No Circuit Overload or Circuit Error

During normal operation, the interruption device 100 supplies power to an external device, such as an appliance, via the receiving connector 104 located within the interruption device 100. When power (i.e. the hot line 116 and neutral line 118) is supplied to the control module 106 of the interruption device 100, the neutral line 118 is passed or supplied directly to a neutral line connection point 104*a* of the receiving connector 104 and the hot line 116 is passed or supplied to a first relay module 112. The first relay module 112 may include a first switch, such as a single pole, double throw switch 120, operable between a first position and a second position, and a first magnetic coil 122 for causing the first single pole, double throw switch 120 to actuate between the first position and the second position as well as from the second position to the first position when energized. Actuation of the first single pole, double throw switch 120 provides for a switching terminal for interrupting and re-routing the supply of power to the appliance.

The hot line 116 of the power source 102 may be supplied to the first single pole, double throw switch 120 of the first relay module 112 via the control module 106 causing the first single pole, double throw switch 120 to actuate to the first position. When the first single pole, double throw switch 120 is in the first position, the flow of power follows a first path. When the flow of power follows the first path, the hot line 116 of the power source 102 may be passed or supplied to a hot line connection point 104*b* of the receiving connector 104. As the receiving connector 104 is connected to the hot line 116 and the neutral line 118 of the power source 102, AC power is available via the receiving connector 104 and an appliance plugged into the receiving connector 104 is able to receive power. The power available from the receiving connector 104 may be the same as the power input into the circuit control board 106. For example, if the power source 102 outputs 110 VAC, the receiving connector outputs 110 VAC.

Circuit Overload or Circuit Error

Upon the occurrence of an event, for example the hot and neutral lines become connected together creating a short circuit, a circuit overload is detected or an appliance malfunctions; the hot line connected to the hot line connection point 104*b* of the receiving connector 104 becomes a neutral line. As a result, a neutral line is provided to one end of the first winding of the first transformer 107 in the first transformer module 108. As described above, the other end of the first winding of the transformer 107 is connected to the hot line 116 so the connection of the neutral line to the first transformer 107 causes the first transformer 107 in the first transformer module 108 to power on inducing a current in the secondary winding of the first transformer 107.

In the first transformer module 108, a first full wave rectifier 128 is connected in parallel with the second winding of the first transformer 107 and a first capacitor 130 is connected in parallel with the first full wave rectifier 128 for lessening the variation in the rectified AC output voltage waveform from the first full wave rectifier 128. Powering on the first transformer 107 and inducing a current in the second winding causes power to be supplied to the first full wave rectifier 128 which in turn activates or energizes a first magnetic coil 122 in the first relay module 112. Upon energizing the first magnetic coil 122, the first single pole, double throw switch 120 may actuate from the first position to the second position. When the first single pole, double throw switch 120 is in the second position, a second transformer 109 in the second transformer module 110 is powered on inducing a current in the secondary winding of the second transformer 109. As a result, power is supplied to a second full wave rectifier 132 in the second transformer module 110 which in turn activates or energizes a second magnetic coil 134 in the second relay module 114. Upon energizing the second magnetic coil 134, the second single pole, double throw switch 136 may actuate from the first position to the second position. As with the first transformer module 108, a second capacitor 133 may be connected in parallel with second first full wave rectifier 132 for lessening the variation in the rectified AC output voltage waveform from the second full wave rectifier 132. When the second single pole, double throw switch 136 is actuated to the second position, the flow of power is interrupted and re-routed from the first path to a second path. According to one embodiment, the second path may supply or direct the flow of power to an event indicator, such as a light 138, for example a light emitting diode (LED). When the flow of power is re-routed to the light 138, the light 138 turns on providing an indication that the flow of power has been interrupted and re-routed. A second LED 139 may also be connected to the second single pole, double throw switch 136 such that when the switch 136 is in the first position, the second LED 139 may be lit indicated that the flow of power has not been re-routed. According to one example, the lights may be different colors, the LED 138 may be red and the second LED 139 may be green.

As described above, the first transformer module 108 may cause an interruption of the flow of power in the event of a short circuit or an excessive load is detected while the second transformer module 110 may cause a re-routing of the power once there has been an interruption in power.

Interruption Device having Dual Switches

Figure 3:
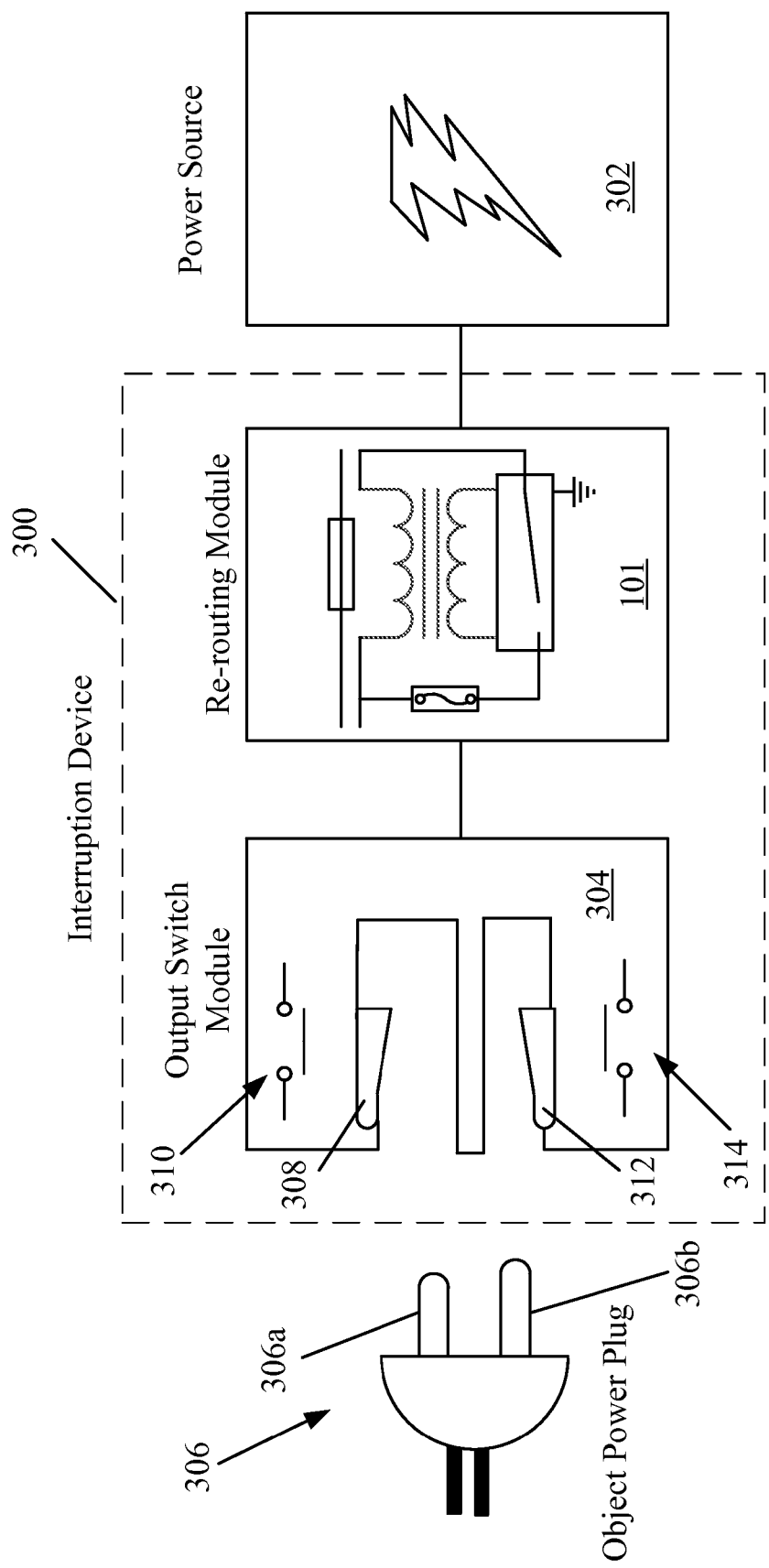
FIG. 3 is a block diagram illustrating a general overview of a system for automatically interrupting and re-routing the flow of power upon the occurrence of an event, according to an embodiment.

FIG. 3 is a block diagram illustrating a general overview of a system for automatically interrupting and re-routing the flow of power upon the occurrence of an event, according to an embodiment. As shown, an interruption device 300 may be connected to and receive power from a power source 302. The interruption device 300 includes the re-routing module 101, as described above with reference to FIG. 2, and an output switch module 304 for supplying power to an external device, such as an appliance, plugged into the output switch module 304. The hot line and neutral line of the power source 302 may be connected to switches in the output switch module 304 via the re-routing module 101.

A power cord or plug 306 of the external device may be inserted into the output switch module 304 to receive power to turn on or power up the appliance. In one embodiment, the plug 306 may include a pair of protruding prongs, a hot line prong 306*a* and a neutral line prong 306*b*. When inserted into the output switch module 304, the hot line prong 306*a* engages with a first switch mechanism 308 causing the first switch mechanism 308 to move in an outwardly direction to engage with and push down on a first switch 310 causing the first switch 310 to actuate to a closed position. When the first switch 310 is in the closed position, the first switch 310 comes into contact with and receives the hot line from the power source, via the re-routing module 101 as the first switch 310 is directly connected to the hot line output from the re-routing module. As the first switch 310 is connected to the hot line prong 306*a* via the first switch mechanism 308, the hot line is provided to the hot line prong 306*a*.

Additionally, insertion of the power plug 306 into the output switch module 304 causes the ground line prong 306*b* to engage with a second switch mechanism 312 causing the second switch mechanism 312 to move in an outwardly direction to engage with and push down on a second switch 314 causing the second switch 314 to actuate to a closed position. When the second switch 314 is in the closed position, the second switch 314 comes into contact with and receives the neutral line from the power source, via the re-routing module 101 as the second switch 314 is directly connected to the neutral line output from the re-routing module. As the second switch 314 is connected to the neutral line prong 306*b* via the second switch mechanism 312, the neutral line is provided to the neutral line prong 306*b*.

Upon the occurrence of an event, the hot line and neutral line are interrupted and re-routed away from the output switch module 304 which in turn interrupts and re-routes the flow of power away from the plug 306 and the external device.

The switches may be connected in parallel, series or a combination of parallel and series to maintain interruption of the flow of power from the power source for safety purposes.

Interruption Device having Ground Fault Switch

Figure 4:
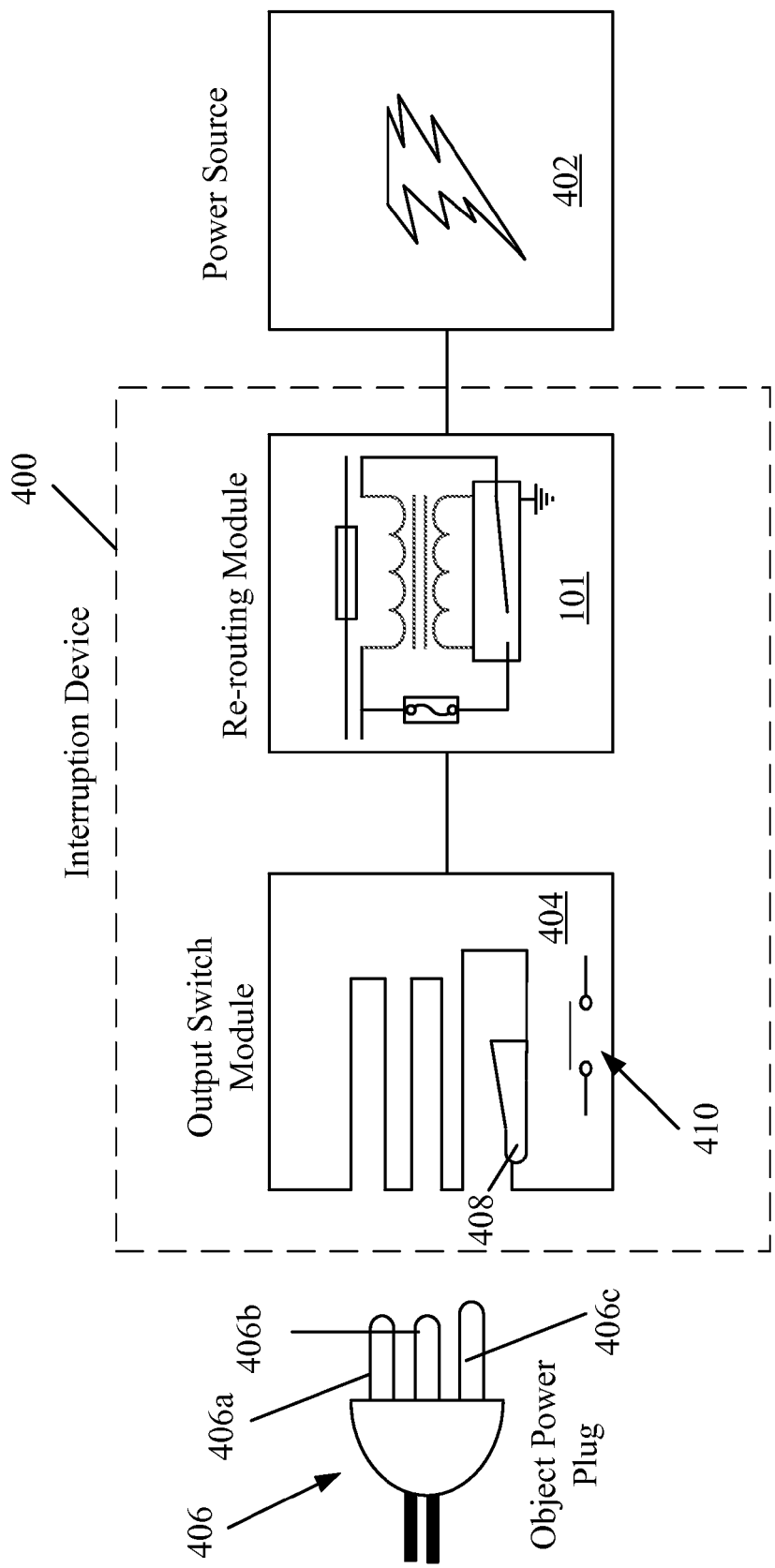
FIG. 4 is a block diagram illustrating a general overview of system, having a ground fault switch, for automatically interrupting and re-routing power upon the occurrence of an event, according to an embodiment.

FIG. 4 is a block diagram illustrating a general overview of system, having a ground fault switch, for automatically interrupting and re-routing power upon the occurrence of an event, according to an embodiment. As shown, an interruption device 400 may be connected to and receive power from a power source 402. The interruption device 400 includes the re-routing module 101, as described above with reference to FIG. 2, and an output switch module 404 for supplying power to an external device, such as an appliance, plugged into the output switch module 404. The hot line, neutral line and ground line of the power source 402 may be connected to the output switch module 304 via the re-routing module 101.

A power cord or plug 406 of an external device may include a neutral line prong 406*a*, a hot line prong 406*b* and a ground fault prong 406*c*. The power plug 406 may be inserted into the output switch module 404 to receive power to turn on or power up the external device. When the plug 406 is inserted into the output switch module 404, the ground fault prong 406*c* engages with a switch mechanism 408 causing the switch mechanism 408 to move in an outwardly direction to engage with and push down on a switch 410 causing the switch 410 to actuate to a closed position. When the switch 410 is in the closed position, the switch 410 comes into contact with ground line from the power source, via the re-routing module 101 as the switch 410 is directly connected to the ground line output from the re-routing module. Insertion of the plug 406 also causes the neutral line prong 406*a* to come into contact with the neutral line of the power source, via the re-routing module 101, and the hot line prong 406*b* comes into contact with the hot line of the power source, via the re-routing module 101. As the three prongs 406*a*-406*c* are now connected to the power source, the flow of power is provided to the plug 406 which in turn provides power to the external device connected to the plug 406.

Upon the occurrence of an event, the ground line is interrupted and re-routed away from the output switch module 404 which in turn interrupts and re-routes the flow of power away from the plug 406.

Interruption Device Having Single Switch

Figure 5:
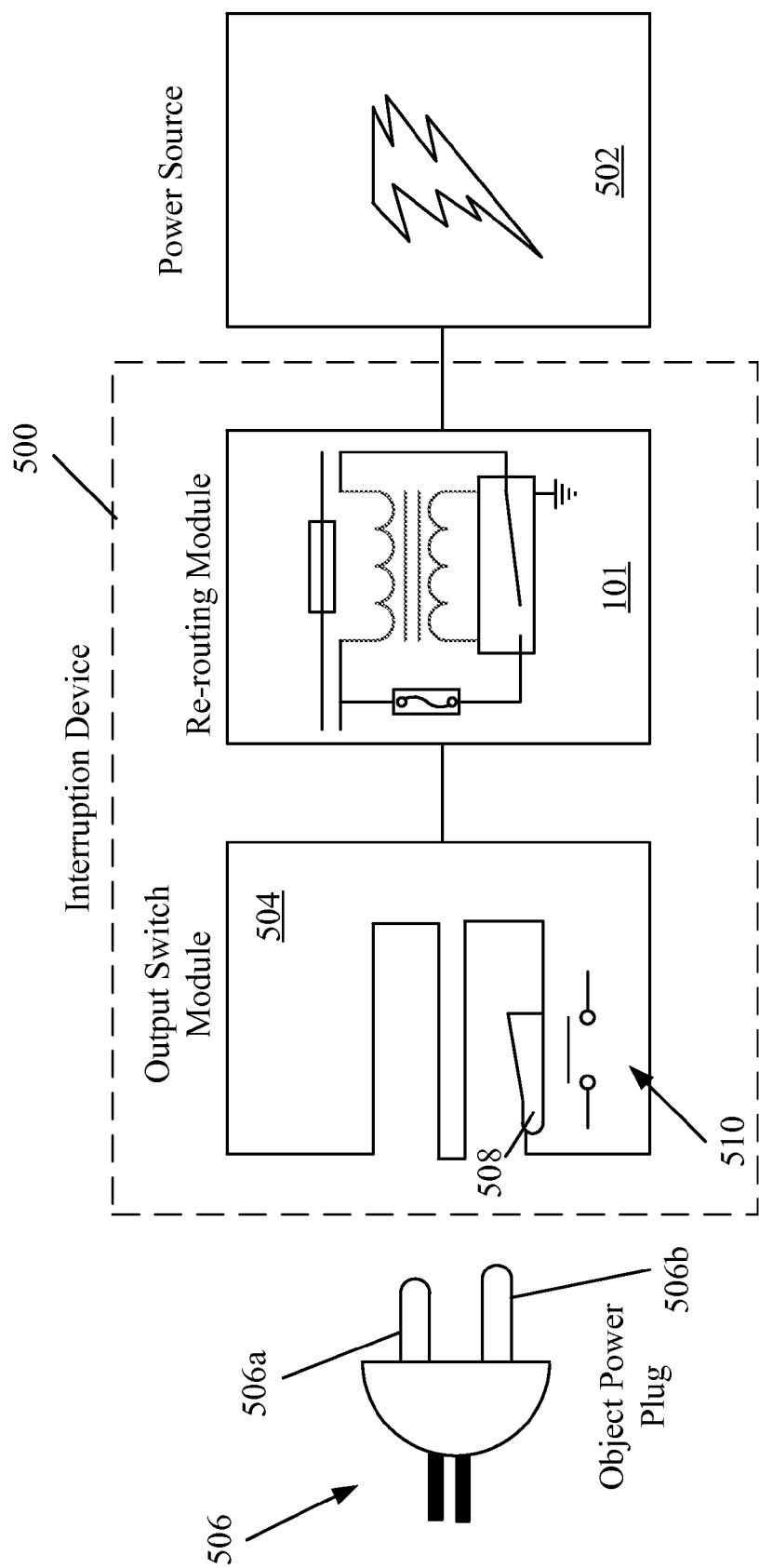
FIG. 5 is a block diagram illustrating a general overview of a system for automatically interrupting and re-routing power upon the occurrence of an event, according to an embodiment.

FIG. 5 is a block diagram illustrating a general overview of a system for automatically interrupting and re-routing power upon the occurrence of an event, according to an embodiment. As shown, an interruption device 500 may be connected to and receive power from a power source 502. The interruption device 500 includes the re-routing module 101, as described above with reference to FIG. 2, and an output switch module 504 for supplying power to an external device, such as an appliance, plugged into the output switch module 504. The hot line and neutral line of the power source 502 may be connected to the output switch module 504 via the re-routing module 101.

A power cord or plug 506 of the external device may be inserted into the output switch module 504 to receive power to turn on or power up the appliance. In one embodiment, the plug 506 may include a pair of protruding prongs, a hot line prong 506*a* and a neutral line prong 506*b*. When inserted into the output switch module 504, the neutral line prong 506*b* engages with a switch mechanism 508 causing the switch mechanism 508 to move in an outwardly direction to engage with and push down on a switch 510 causing the switch 510 to actuate to a closed position. When the switch 510 is in the closed position, the switch 510 comes into contact with and receives the neutral line from the power source, via the re-routing module 101 as the switch 510 is directly connected to the neutral line output from the re-routing module 101. As the switch 510 is connected to the neutral line prong 506*b* via the switch mechanism 508, the neutral line is provided to the neutral line prong 506*b*. Insertion of the plug 506 also causes the hot line prong 506*a* to come into contact with the hot line of the power source, via the re-routing module 101. As the hot line and neutral prongs 506*a* and 506*b* are now connected to the power source, the flow of power is provided to the plug 506 which in turn provides power to the external device connected to the plug 506.

Interruption Device having Touch Pad

Figure 6:
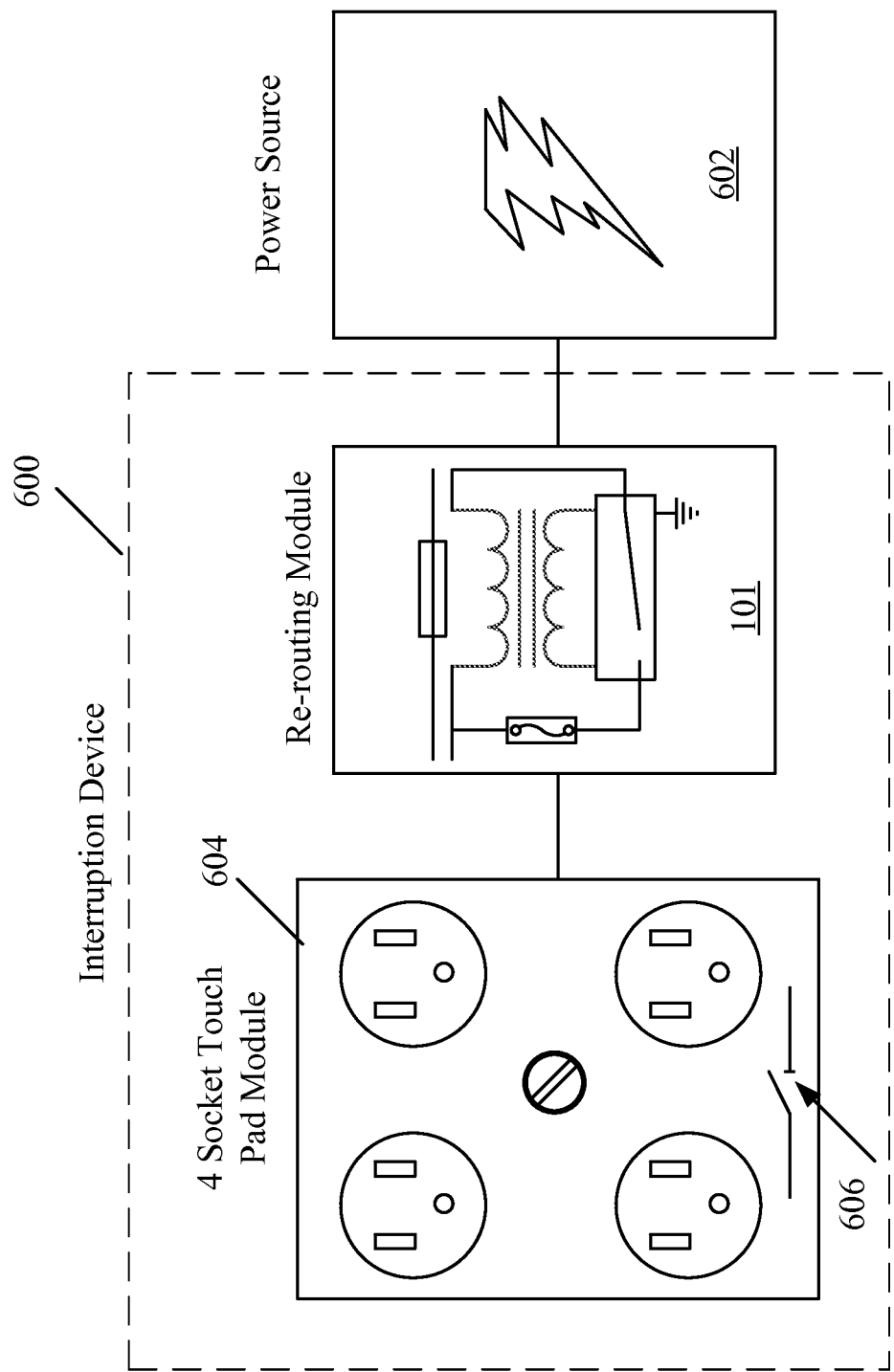
FIG. 6 is a block diagram illustrating a general overview of a system, having a touch pad switch module, for automatically interrupting and re-routing power upon the occurrence of an event, according to an embodiment.

FIG. 6 is a block diagram illustrating a general overview of a system, having a touch pad switch module, for automatically interrupting and re-routing power upon the occurrence of an event, according to an embodiment. As shown, an interruption device 600 may be connected to and receive power from a power source 602. The interruption device 600 includes the re-routing module 101, as described above with reference to FIG. 2, and a socket touch pad module 604 for supplying power to one or more external devices, such as appliances, plugged into the socket touch pad module 604.

Although the socket touch pad module 604 illustrates four (4) sockets, this is by way of example only and the socket touch pad module 604 may include more or less sockets. In one embodiment, the touch pad module 604 may include a heat sensor switch 606 that interrupts the flow of power or energy when the switch 606 is touched or turned on. The heat sensor switch 606 may be connected to the power source 602 via the re-routing module 101 as the switch 606 is directly connected to the power output from the re-routing module. When in the closed position, the heat sensor switch 606 allows the flow of power to be supplied to each of the sockets. Conversely, when the heat sensor switch 606 in an open position, the flow of power is interrupted and re-routed away from the sockets.

When the socket touch pad module 604 senses heat from a hand or other source, the switch 606 actuates to the open position causing the flow of power to be interrupted and re-routed away from the sockets causing any appliance plugged into the socket touch pad module 604 to lose power. As described above, this occurs via the re-routing module 101 of the interruption device 500 as it is used to re-route the flow power or energy upon the occurrence of an event, such as an abnormal flow of electricity from the appliance or a short circuit. As the power is re-routed away from the socket touch pad module 604, power is interrupted to the objects connected to or plugged into the socket touch pad module 604 of the interruption device 100 preventing the appliances from being damaged from circuit overload.

One or more of the components and functions illustrated in FIGS. 1-6 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

The invention claimed is:

1. An interruption device for automatically re-routing power, comprising:
    a re-routing module, the re-routing module comprising:
        a control module having a first control input line and a second control input line for receiving power from a power source and a first control output line and a second control output line for distributing power from the power source;
        a first relay module, having a first relay input electrically connected in series with the first control output line of the control module, for re-routing a flow of power within the interruption device between a first path and a second path;
        a first transformer module, being electrically connected in parallel with a first output of the first relay module and the control module, for re-routing the flow of power upon the occurrence of an event;
        a second transformer module, being electrically connected in series with a second output of the first relay module, for re-routing the flow of power upon the occurrence of the event; and
        a second relay module, having a second relay input electrically connected in series with the second transformer module, for providing notification of the re-routing of the flow of power.

2. The interruption device of claim 1, wherein the re-routing module further comprises a receiving connector for providing the flow of power to an external device, the receiving connector having a first connection point and a second connection point, the first connection point directly connected to the first output of the first relay module and the second connection point directly connected to the second control output line of the control module.

3. The interruption device of claim 2, wherein the first transformer module comprises:
    a first transformer having a first winding directly connected to the first control input line and a second winding directly connected to the second relay input of the second relay module;
    a first full wave rectifier, connected in parallel with the second winding of the first transformer; and
    a first capacitor, connected in parallel with the first full wave rectifier.

4. The interruption device of claim 3, wherein the first relay module comprises:
    a first switch operable between a first position and a second position; and
    a first magnetic coil, connected to the first transformer module, for causing the first switch to actuate between the first and second positions when energized.

5. The interruption device of claim 4, wherein the second transformer module comprises:
    a second transformer having a first transformer winding and a second transformer winding;
    a second full wave rectifier, connected in parallel with the second transformer winding of the second transformer; and
    a second capacitor, connected in parallel with the second full wave rectifier.

6. The interruption device of claim 5, wherein the second relay module comprises:
    a second switch operable between a first switch position and a second switch position;

a second magnetic coil, connected to the second transformer module, for causing the second switch to actuate between the first and second switch positions when energized; and an event notifier, in communication with the second switch, for providing the notification of the re-routing of the flow of power.

7. The interruption device of claim 6, wherein when the first switch is in the first position, the first connection point of the receiving connector is connected to a hot line of the power source via the control module and the second connection point of the receiving connector is connected to a neutral line of the power source via the control module causing the flow of power to flow along the first path to the receiving connector.

8. The interruption device of claim 7, wherein when the first switch is in the second position, the first connection point of the receiving connector is connected to the neutral line of the power source causing the neutral line to be connected to the first winding of the first transformer powering on the transformer and switching the flow of power from the first path to the second path.

9. The interruption device of claim 8, wherein when the first switch is in the second position, the second transformer is powered on causing the second switch to actuate from the first switch position to the second switch position re-routing the flow of power to the event notifier.

10. The interruption device of claim 6, wherein the flow of power is returned to the first path and the receiving connector once the event has been removed or repaired.

11. The interruption device of claim 2, further comprising an output switch module, in communication with the re-routing module, for receiving a power plug from an external device for supplying the flow of power to the external device, the output switch module comprising:

at least one switch mechanism for receiving a prong from the power plug of the external device; and at least one output switch coupled to the re-routing module; and wherein the insertion of the prong into the at least one switch mechanism causes the at least one switch mechanism to engage and push down on the least one output switch causing the flow of energy from the re-routing module to flow into the power plug.

12. The interruption device of claim 11, wherein the at least one output switch is a ground fault switch.

13. The interruption device of claim 1, further comprising a touch pad module, in communication with the re-routing module, for re-routing the flow of power upon sensing heat when touched by a hand, the touch pad module comprising:

a plurality of receiving connectors for receiving a plurality of power plugs from a plurality of external devices;

a heat sensing switch in communication with the plurality of receiving connectors and the re-routing module, the heat sensing switch actuating to an open position upon the sensing of the heat causing the flow of power to be re-routed away from the plurality or receiving connectors.

14. The interruption device of claim 1, wherein the event includes at least one of a short circuit and a current excess of a pre-determined amount.

15. An interruption device for automatically re-routing power, comprising:

a re-routing module, the re-routing module comprising:

a control module having a first control input line and a second control input line for receiving power from a power source and a first control output line and a second control output line for distributing power from the power source;

a first relay module, having a first relay input electrically connected in series with the first control output line of the control module, for re-routing a flow of power within the interruption device between a first path and a second path;

a first transformer module, being electrically connected in parallel with a first output of the first relay module and the control module, for re-routing the flow of power upon the occurrence of an event;

a second transformer module, being electrically connected in series with a second output of the first relay module, for re-routing the flow of power upon the occurrence of the event; and a second relay module, having a second relay input electrically connected in series with the second transformer module, for providing notification of the re-routing of the flow of power; and an output switch module, in communication with the re-routing module, for receiving a power plug from an external device for supplying the flow of power to the external device, the output switch module comprising:

at least one switch mechanism for receiving a prong from the power plug of the external device; and at least one output switch coupled to the re-routing module; and wherein the insertion of the prong into the at least one switch mechanism causes the at least one switch mechanism to engage and push down on the least one output switch causing the flow of energy from the re-routing module to flow into the power plug.

16. The interruption device of claim 15, wherein the at least one output switch is a ground fault switch.

17. The interruption device of claim 16, wherein the event includes at least one of a short circuit and a malfunction of the external device.

18. The interruption device of claim 15, wherein the flow of power is returned to the first path and the output switch module once the event has been removed or repaired.

19. An interruption device for automatically re-routing power, comprising:

a re-routing module, the re-routing module comprising:

a control module for receiving and distributing power from a power source;

a first relay module, in communication with the control module, for switching a flow of power within the interruption device between a first path and a second path, the first relay module comprising:

a first switch operable between a first position and a second position; and a first magnetic coil, connected to the first transformer module, for causing the first switch to actuate between the first and second positions when energized;

a first transformer module, in communication with the first relay module, for interrupting the flow of power upon the occurrence of an event, the first transformer module comprising:

a first transformer having a first winding and a second winding;

a first full wave rectifier, connected in parallel with the second winding of the first transformer; and a first capacitor, connected in parallel with the first full wave rectifier;

a second transformer module, in communication with the first relay module, for re-routing the flow of power upon the occurrence of the event, the second transformer module comprising:
  a second transformer having a first transformer winding and a second transformer winding;
  a second full wave rectifier, connected in parallel with the second transformer winding of the second transformer; and
  a second capacitor, connected in parallel with the second full wave rectifier; and
a second relay module, in communication with the second transformer module, for providing notification of the re-routing of the flow of power.

20. The interruption device of claim 19, wherein the re-routing module further comprises a receiving connector for providing the flow power to an external device, the receiving connector having a first connection point and a second connection point, the first connection point in communication with the first relay module and the second connection point in communication with the control module.

* * * * *